United States Patent [19]
Kim et al.

[11] Patent Number: 5,875,026
[45] Date of Patent: Feb. 23, 1999

[54] METHOD AND SYSTEM FOR SPATIAL FILTERING OF AN EXTENDED RADIATION SOURCE WITH CHROMATIC ABERRATION OF IMAGING OPTICS IN SINGLE-ELEMENT DETECTOR MEASUREMENT FOR MONITORING OF THE EXTENDED RADIATION SOURCE

[75] Inventors: Cheol-Jung Kim; Kwang-Suk Kim, both of Daejeon-Si, Rep. of Korea

[73] Assignee: Korea Atomic Energy Research Institute, Daejeon-Si, Rep. of Korea

[21] Appl. No.: 763,752

[22] Filed: Dec. 11, 1996

[51] Int. Cl.$^6$ .................................. G01J 1/28; G01J 3/46
[52] U.S. Cl. ........................... 356/121; 356/402; 356/419
[58] Field of Search .................................. 356/121, 402, 356/406, 416, 419; 250/226

[56] References Cited

U.S. PATENT DOCUMENTS

| | | |
|---|---|---|
| 4,909,633 | 3/1990 | Okui et al. ............................... 250/226 |
| 4,992,859 | 2/1991 | Yoshida . |
| 5,155,329 | 10/1992 | Terada et al. . |
| 5,206,502 | 4/1993 | Gardner .................................. 250/226 |
| 5,278,402 | 1/1994 | Wein ...................................... 250/226 |
| 5,444,236 | 8/1995 | Ludington et al. . |
| 5,592,285 | 1/1997 | Pund ...................................... 356/121 |

*Primary Examiner*—Frank G. Font
*Assistant Examiner*—Zandra V. Smith
*Attorney, Agent, or Firm*—Dilworth & Barrese

[57] ABSTRACT

A method and system is disclosed in which the local variation of an extended radiation source is monitored with single-element detector. The chromatic aberration of the imaging optics induces the different transmittance curves for different wavelengths, and the different shape in the transmittance curve is used as a spatial filter which is multiplied to the chromatic intensity profile of the extended radiation source to detect the local variation in the intensity profile of the extended radiation source. The signal processing of the chromatic signals is implemented to detect the size variation and the environmental effects on the extended radiation source. A fiber is also used for remote operation.

10 Claims, 6 Drawing Sheets

| Source Radius / Focus Shift | 0.0 | 0.1 | 0.2 | 0.3 | 0.4 | 0.5 | 0.6 | 0.7 | 0.8 | 0.9 | 1.0 | 1.1 | 1.2 | 1.3 | 1.4 | 1.5 | 1.6 | 1.7 | 1.8 | 1.9 | 2.0 |
|---|---|---|---|---|---|---|---|---|---|---|---|---|---|---|---|---|---|---|---|---|---|
| -1.9 | 100 | 100 | 100 | 100 | 100 | 100 | 100 | 100 | 95 | 69 | 7.3 | 0 | 0 | 0 | 0 | 0 | 0 | 0 | 0 | 0 | 0 |
| -1.7 | 100 | 100 | 100 | 100 | 100 | 100 | 100 | 100 | 89 | 60 | 17 | 5.3 | 0 | 0 | 0 | 0 | 0 | 0 | 0 | 0 | 0 |
| -1.5 | 100 | 100 | 100 | 100 | 100 | 100 | 100 | 95 | 82 | 59 | 22 | 9.4 | 2.2 | 0 | 0 | 0 | 0 | 0 | 0 | 0 | 0 |
| -1.3 | 100 | 100 | 100 | 100 | 100 | 100 | 98 | 93 | 77 | 55 | 32 | 13 | 5.2 | 0 | 0 | 0 | 0 | 0 | 0 | 0 | 0 |
| -1.1 | 100 | 100 | 100 | 100 | 100 | 100 | 95 | 84 | 72 | 54 | 33 | 22 | 9.4 | 5.2 | 0 | 0 | 0 | 0 | 0 | 0 | 0 |
| -0.9 | 100 | 100 | 100 | 100 | 100 | 96 | 93 | 82 | 70 | 52 | 33 | 22 | 13 | 5.2 | 4.2 | 0 | 0 | 0 | 0 | 0 | 0 |
| -0.7 | 100 | 100 | 100 | 100 | 96 | 95 | 85 | 77 | 66 | 52 | 40 | 22 | 13 | 5.2 | 5.2 | 0 | 0 | 0 | 0 | 0 | 0 |
| -0.5 | 100 | 100 | 100 | 98 | 93 | 93 | 84 | 72 | 61 | 50 | 38 | 29 | 20 | 13 | 5.2 | 5.2 | 0 | 0 | 0 | 0 | 0 |
| -0.3 | 100 | 100 | 95 | 95 | 89 | 87 | 82 | 70 | 61 | 50 | 38 | 29 | 22 | 13 | 5.2 | 5.2 | 3.2 | 0 | 0 | 0 | 0 |
| -0.1 | 100 | 100 | 100 | 91 | 87 | 84 | 75 | 68 | 59 | 50 | 38 | 29 | 22 | 18 | 13 | 5.2 | 5.3 | 0 | 0 | 0 | 0 |
| 0.1 | 100 | 100 | 98 | 89 | 82 | 79 | 73 | 64 | 57 | 50 | 38 | 29 | 25 | 20 | 13 | 10 | 5.3 | 5.3 | 0 | 0 | 0 |
| 0.3 | 100 | 98 | 93 | 87 | 79 | 77 | 68 | 64 | 55 | 45 | 38 | 32 | 27 | 20 | 13 | 13 | 5.3 | 5.3 | 3.2 | 0 | 0 |
| 0.5 | 100 | 96 | 89 | 83 | 75 | 73 | 66 | 60 | 53 | 45 | 38 | 32 | 27 | 20 | 16 | 13 | 10 | 5.3 | 5.3 | 0 | 0 |
| 0.7 | 92 | 91 | 87 | 73 | 69 | 71 | 64 | 57 | 51 | 43 | 39 | 34 | 29 | 23 | 18 | 13 | 10 | 6.3 | 5.3 | 3.2 | 0 |
| 0.9 | 84 | 85 | 83 | 71 | 69 | 62 | 60 | 53 | 51 | 43 | 39 | 34 | 23 | 23 | 20 | 16 | 13 | 10 | 5.3 | 5.3 | 3.2 |
| 1.1 | 71 | 78 | 78 | 71 | 65 | 62 | 60 | 53 | 51 | 43 | 39 | 34 | 25 | 25 | 21 | 18 | 13 | 10 | 6.3 | 5.3 | 5.3 |
| 1.3 | 71 | 70 | 69 | 67 | 62 | 62 | 58 | 53 | 49 | 43 | 39 | 34 | 28 | 25 | 23 | 18 | 16 | 10 | 8.3 | 5.3 | 5.3 |
| 1.5 | 71 | 67 | 67 | 71 | 62 | 62 | 54 | 53 | 49 | 43 | 39 | 34 | 30 | 25 | 23 | 18 | 16 | 10 | 8.3 | 5.3 | 5.3 |
| 1.7 | 63 | 63 | 63 | 63 | 60 | 58 | 54 | 51 | 44 | 41 | 39 | 32 | 30 | 25 | 23 | 18 | 18 | 14 | 10 | 8.3 | 5.3 |

Wavelength 0.532 μm

Wavelength 0.95 μm

| Focus Shift \ Source Radius | 0.0 | 0.1 | 0.2 | 0.3 | 0.4 | 0.5 | 0.6 | 0.7 | 0.8 | 0.9 | 1.0 | 1.1 | 1.2 | 1.3 | 1.4 | 1.5 | 1.6 | 1.7 | 1.8 | 1.9 | 2.0 |
|---|---|---|---|---|---|---|---|---|---|---|---|---|---|---|---|---|---|---|---|---|---|
| -1.9 | 100 | 100 | 100 | 100 | 99 | 88 | 74 | 63 | 52 | 43 | 36 | 27 | 18 | 10 | 3.3 | 0 | 0 | 0 | 0 | 0 | 0 |
| -1.7 | 100 | 100 | 100 | 100 | 100 | 95 | 78 | 67 | 54 | 45 | 36 | 27 | 18 | 8.3 | 0 | 0 | 0 | 0 | 0 | 0 | 0 |
| -1.5 | 100 | 100 | 100 | 100 | 100 | 95 | 78 | 67 | 57 | 45 | 36 | 27 | 18 | 8.3 | 0 | 0 | 0 | 0 | 0 | 0 | 0 |
| -1.3 | 100 | 100 | 100 | 100 | 100 | 100 | 88 | 72 | 59 | 48 | 36 | 27 | 18 | 3.2 | 0 | 0 | 0 | 0 | 0 | 0 | 0 |
| -1.1 | 100 | 100 | 100 | 100 | 100 | 100 | 99 | 78 | 67 | 50 | 38 | 23 | 16 | 0 | 0 | 0 | 0 | 0 | 0 | 0 | 0 |
| -0.9 | 100 | 100 | 100 | 100 | 100 | 100 | 100 | 90 | 69 | 52 | 38 | 21 | 10 | 0 | 0 | 0 | 0 | 0 | 0 | 0 | 0 |
| -0.7 | 100 | 100 | 100 | 100 | 100 | 100 | 100 | 100 | 80 | 56 | 38 | 18 | 4.2 | 0 | 0 | 0 | 0 | 0 | 0 | 0 | 0 |
| -0.5 | 100 | 100 | 100 | 100 | 100 | 100 | 100 | 100 | 91 | 58 | 36 | 11 | 0 | 0 | 0 | 0 | 0 | 0 | 0 | 0 | 0 |
| -0.3 | 100 | 100 | 100 | 100 | 100 | 100 | 100 | 100 | 100 | 89 | 26 | 0 | 0 | 0 | 0 | 0 | 0 | 0 | 0 | 0 | 0 |
| -0.1 | 100 | 100 | 100 | 100 | 100 | 100 | 100 | 100 | 100 | 100 | 17 | 0 | 0 | 0 | 0 | 0 | 0 | 0 | 0 | 0 | 0 |
| 0.1 | 100 | 100 | 100 | 100 | 100 | 100 | 100 | 100 | 100 | 98 | 17 | 0 | 0 | 0 | 0 | 0 | 0 | 0 | 0 | 0 | 0 |
| 0.3 | 100 | 100 | 100 | 100 | 100 | 100 | 100 | 100 | 100 | 93 | 32 | 5.2 | 0 | 0 | 0 | 0 | 0 | 0 | 0 | 0 | 0 |
| 0.5 | 100 | 100 | 100 | 100 | 100 | 100 | 100 | 100 | 96 | 84 | 43 | 11 | 2.2 | 0 | 0 | 0 | 0 | 0 | 0 | 0 | 0 |
| 0.7 | 100 | 100 | 100 | 100 | 100 | 100 | 100 | 100 | 93 | 79 | 45 | 17 | 5.2 | 0 | 0 | 0 | 0 | 0 | 0 | 0 | 0 |
| 0.9 | 100 | 100 | 100 | 100 | 100 | 100 | 100 | 96 | 89 | 72 | 52 | 22 | 13 | 5.2 | 0 | 0 | 0 | 0 | 0 | 0 | 0 |
| 1.1 | 100 | 100 | 100 | 100 | 100 | 100 | 100 | 95 | 84 | 70 | 52 | 31 | 13 | 5.2 | 5.2 | 0 | 0 | 0 | 0 | 0 | 0 |
| 1.3 | 100 | 100 | 100 | 100 | 100 | 100 | 96 | 93 | 82 | 68 | 52 | 31 | 22 | 13 | 5.2 | 0 | 0 | 0 | 0 | 0 | 0 |
| 1.5 | 100 | 100 | 100 | 100 | 100 | 100 | 95 | 84 | 77 | 63 | 52 | 31 | 22 | 13 | 5.2 | 5.2 | 0 | 0 | 0 | 0 | 0 |
| 1.7 | 100 | 100 | 100 | 100 | 100 | 96 | 93 | 84 | 72 | 61 | 50 | 36 | 22 | 13 | 13 | 5.2 | 0 | 0 | 0 | 0 | 0 |

| Wavelength 1.5 μm | | | | | | | | | | | | | | | | | | | | | |
|---|---|---|---|---|---|---|---|---|---|---|---|---|---|---|---|---|---|---|---|---|---|
| Source Radius / Focus Shift | 0.0 | 0.1 | 0.2 | 0.3 | 0.4 | 0.5 | 0.6 | 0.7 | 0.8 | 0.9 | 1.0 | 1.1 | 1.2 | 1.3 | 1.4 | 1.5 | 1.6 | 1.7 | 1.8 | 1.9 | 2.0 |
| -1.9 | 100 | 100 | 95 | 84 | 75 | 70 | 59 | 53 | 48 | 39 | 34 | 27 | 23 | 18 | 11 | 8.3 | 3.2 | 0 | 0 | 0 | 0 |
| -1.7 | 100 | 100 | 100 | 93 | 82 | 74 | 63 | 57 | 48 | 43 | 36 | 27 | 23 | 18 | 10 | 5.3 | 0 | 0 | 0 | 0 | 0 |
| -1.5 | 100 | 100 | 100 | 100 | 88 | 76 | 68 | 59 | 52 | 43 | 36 | 29 | 23 | 16 | 10 | 3.2 | 0 | 0 | 0 | 0 | 0 |
| -1.3 | 100 | 100 | 100 | 100 | 95 | 84 | 72 | 63 | 52 | 43 | 36 | 29 | 23 | 16 | 10 | 0 | 0 | 0 | 0 | 0 | 0 |
| -1.1 | 100 | 100 | 100 | 100 | 100 | 88 | 78 | 67 | 55 | 48 | 36 | 29 | 21 | 16 | 8.3 | 0 | 0 | 0 | 0 | 0 | 0 |
| -0.9 | 100 | 100 | 100 | 100 | 100 | 100 | 78 | 70 | 61 | 50 | 38 | 27 | 20 | 10 | 3.2 | 0 | 0 | 0 | 0 | 0 | 0 |
| -0.7 | 100 | 100 | 100 | 100 | 100 | 100 | 88 | 78 | 65 | 52 | 40 | 27 | 18 | 10 | 0 | 0 | 0 | 0 | 0 | 0 | 0 |
| -0.5 | 100 | 100 | 100 | 100 | 100 | 100 | 95 | 88 | 67 | 56 | 40 | 27 | 18 | 4.2 | 0 | 0 | 0 | 0 | 0 | 0 | 0 |
| -0.3 | 100 | 100 | 100 | 100 | 100 | 100 | 100 | 99 | 78 | 56 | 40 | 27 | 14 | 0 | 0 | 0 | 0 | 0 | 0 | 0 | 0 |
| -0.1 | 100 | 100 | 100 | 100 | 100 | 100 | 100 | 100 | 83 | 58 | 42 | 23 | 8.3 | 0 | 0 | 0 | 0 | 0 | 0 | 0 | 0 |
| 0.1 | 100 | 100 | 100 | 100 | 100 | 100 | 100 | 100 | 100 | 69 | 42 | 16 | 0 | 0 | 0 | 0 | 0 | 0 | 0 | 0 | 0 |
| 0.3 | 100 | 100 | 100 | 100 | 100 | 100 | 100 | 100 | 100 | 79 | 44 | 6.3 | 0 | 0 | 0 | 0 | 0 | 0 | 0 | 0 | 0 |
| 0.5 | 100 | 100 | 100 | 100 | 100 | 100 | 100 | 100 | 100 | 100 | 40 | 0 | 0 | 0 | 0 | 0 | 0 | 0 | 0 | 0 | 0 |
| 0.7 | 100 | 100 | 100 | 100 | 100 | 100 | 100 | 100 | 100 | 100 | 44 | 0 | 0 | 0 | 0 | 0 | 0 | 0 | 0 | 0 | 0 |
| 0.9 | 100 | 100 | 100 | 100 | 100 | 100 | 100 | 100 | 100 | 100 | 64 | 2.2 | 0 | 0 | 0 | 0 | 0 | 0 | 0 | 0 | 0 |
| 1.1 | 100 | 100 | 100 | 100 | 100 | 100 | 100 | 100 | 100 | 95 | 69 | 7.3 | 0 | 0 | 0 | 0 | 0 | 0 | 0 | 0 | 0 |
| 1.3 | 100 | 100 | 100 | 100 | 100 | 100 | 100 | 100 | 100 | 91 | 64 | 15 | 5.3 | 0 | 0 | 0 | 0 | 0 | 0 | 0 | 0 |
| 1.5 | 100 | 100 | 100 | 100 | 100 | 100 | 100 | 100 | 95 | 84 | 59 | 22 | 7.3 | 0 | 0 | 0 | 0 | 0 | 0 | 0 | 0 |
| 1.7 | 100 | 100 | 100 | 100 | 100 | 100 | 100 | 100 | 93 | 82 | 59 | 30 | 13 | 5.3 | 0 | 0 | 0 | 0 | 0 | 0 | 0 |

FIG. 9

METHOD AND SYSTEM FOR SPATIAL FILTERING OF AN EXTENDED RADIATION SOURCE WITH CHROMATIC ABERRATION OF IMAGING OPTICS IN SINGLE-ELEMENT DETECTOR MEASUREMENT FOR MONITORING OF THE EXTENDED RADIATION SOURCE

FIELD OF THE INVENTION

This invention relates to a method and system for monitoring the extended radiation source and, more particularly, to a method and system to apply the spatial filtering of an extended radiation source with chromatic aberration of imaging optics to the monitoring of the extended radiation source with single-element detector.

BACKGROUND OF THE INVENTION

The extended radiation source has been monitored for tracking, weld monitoring and autofocusing with single-element or array detectors. Though the array detector can monitor the variation of the extended radiation source easily, it cannot be used with a single-core fiber.

On the other hand, it is quite difficult to monitor the variation of the extended radiation source with single-element detector. In the tracking, a single-element detector can monitor the motion of the extended radiation source, but the local variation inside of the extended radiation source has never been monitored with single-element detector.

The chromatic aberration of optics has been used in autofocusing (U.S. Pat. No. 4,992,859) and tracking (U.S. Pat. No. 5,444,236). In these U.S. patents, array detectors have been used as means for capturing the images. Therefore, these prior arts have the problem that they cannot be used with the single-core fiber.

Further, the chromatic signals from weld pool have been used in the weld monitoring (U.S. Pat. No. 5,155,329), but this patent does not use the aberration of the optics itself.

SUMMARY OF THE INVENTION

It is a primary object of the present invention to provide a method and system for monitoring the variation of an extended radiation source, in particular the local variation in the intensity profile of an extended radiation source easily and quickly using a single-element detector, to analyze the movement and the decay of an extended radiation source whereby the position and the size of the extended radiation source can be controlled or monitored and, furthermore, the environmental effects on the extended radiation source can also be analyzed.

In the present invention, the spatial filtering of an extended radiation source with chromatic aberration of imaging optics is applied to the monitoring of the variation of the extended radiation source.

According to the present invention, the local variation of an extended radiation source can be detected with single-element detectors, not with an array detector, for faster and easier monitoring of the extended radiation source, and the remote operation with single core fiber transmission is possible.

BRIEF DESCRIPTION OF THE DRAWINGS

FIG. 7 is a table showing datum of a graph shown in FIG. 4;

FIG. 8 is a table showing datum of a graph shown in FIG. 5; and

DETAILED DESCRIPTION OF THE PREFERRED EMBODIMENT

Embodiments of the present invention will now be described in greater detail with reference to more specific drawings and data, which are for a better understanding of the invention and not for limiting purposes.

Figure 1:
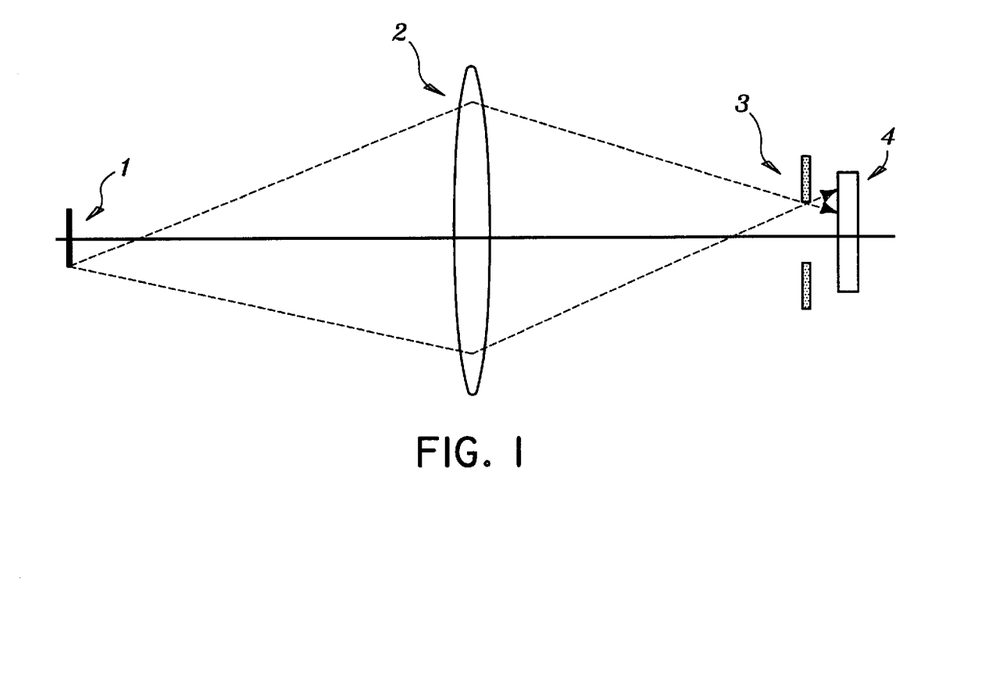
FIG. 1 is a schematic diagram of a simplified model for detection of an extended radiation source.

Referring now to FIG. 1 of the drawings, a schematic diagram of a simplified model for monitoring an extended radiation source is shown. The radiation from the extended radiation source 1 is collected and imaged on an aperture 3 by an imaging optics 2. The extended radiation source 1 can be either a self-radiating extended radiation source or an induced extended radiation source such as the weld pool generated by laser delivered through the same imaging optics 2. The imaging optics 2 consists of one or several lenses having large chromatic aberration.

In the present invention, the aperture 3 can be either the detector itself or any physical aperture such as a hole or an input end of a fiber which delivers the laser to the imaging optics for laser materials processing. The only requirement for an aperture 3 is that all the radiation which passes the aperture 3 should be integrated by the detector 4.

To get the information on the local variation of extended radiation source, the spatial filtering is applied over the extended radiation source 1 for signal enhancement before the radiation gets to the detector 4 and is integrated over the extended radiation source 1. Due to the chromatic aberrations of imaging optics 2, the maximum effective radius of the extended radiation source which the detector 4 can see varies by the wavelengths. The "effective radius" means the radius where the transmittance times the intensity of radiation at that radius has non-zero value for the contribution to the integrated signal.

Figure 4:
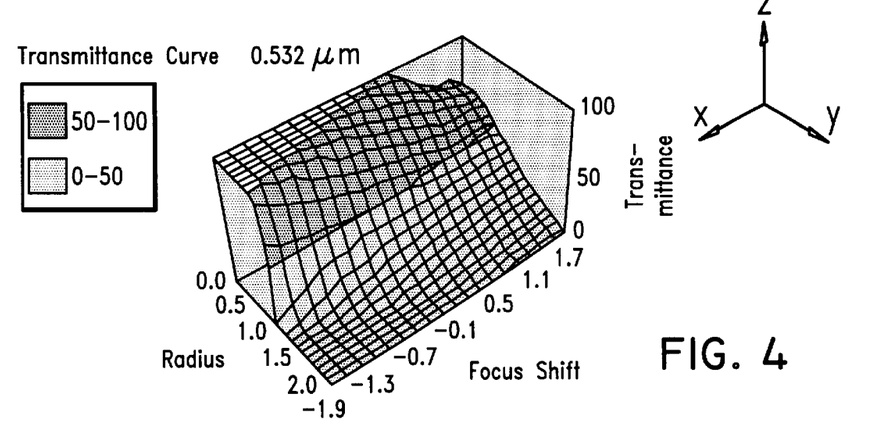
FIG. 4 is a three-dimensional graph showing the transmittance of radiation vs. the position of source at wavelength 0.532 $\mu$m for the system shown in FIG. 3.
Figure 5:
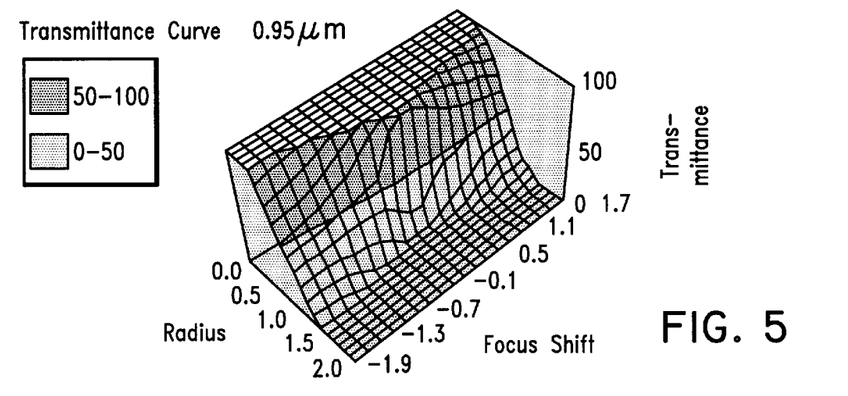
FIG. 5 is a three-dimensional graph showing the transmittance of radiation vs. the position of source at wavelength 0.95 $\mu$m for the system shown in FIG. 3.
Figure 6:
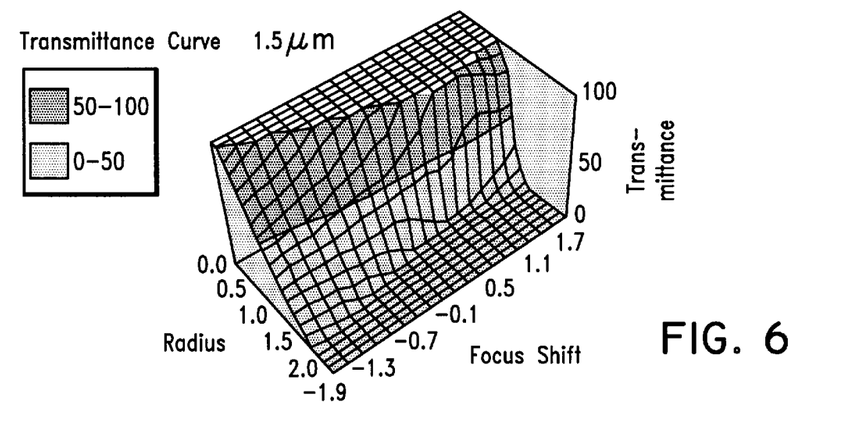
FIG. 6 is a three-dimensional graph showing the transmittance of radiation vs. the position of source at wavelength 1.5 $\mu$m for the system shown in FIG. 3.

Further, the transmittance of radiation from each element of the extended radiation source 1 to the detector 4 depends on the wavelengths of the radiation and the position of the radiation source element as shown in FIGS. 4–6.

In other words, we can adjust the maximum effective radius of extended radiation source and the multiplier, i.e., transmittance for the radiation from each element during integration of the detector signals from all elements within the maximum effective radius by the wavelengths.

In conclusion, the intensity profile of the radiation for each wavelength is multiplied by its own transmittance curve during the integration at detector 4. However, the shape of the intensity profile does not vary much by the wavelengths. In principle, it is quite similar to filtering process, and some wavelength having wider bandwidth can see the wider extended radiation source.

Figure 2:
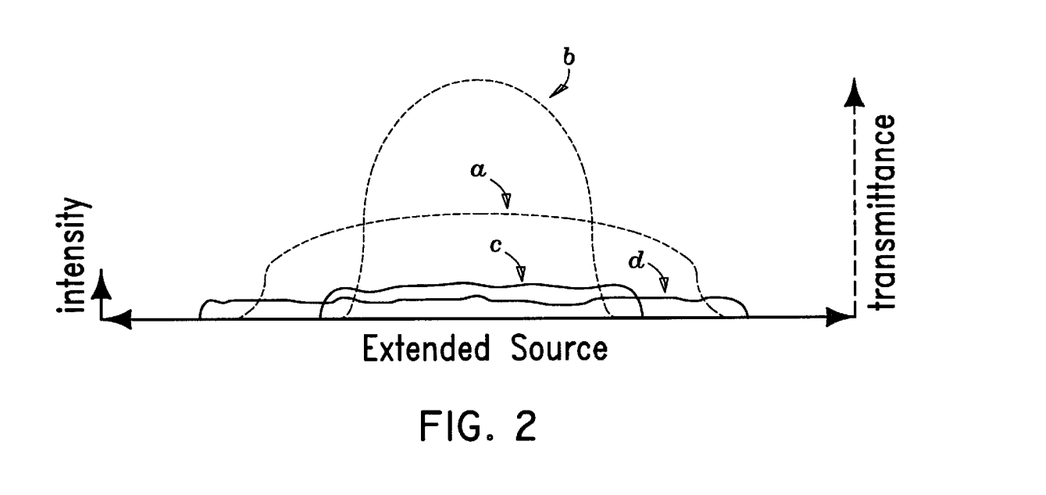
FIG. 2 is a diagram used to explain the signal enhancement to detect the local variation of the extended radiation source with spatial filtering.

In FIG. 2, the curves a, b are the transmittance curves for two wavelengths $W_a$ and $W_b$, and the curves c, d are the intensity curves of the exteded radiation source at two moment, respectively. If the intensity curve of the extended radiation source is changed from curve c to curve d, the detector signal at wavelength $W_b$ can distinguish only the change in the intensity of the extended radiation source. However, in this case, the detector signal at wavelength $W_a$ can distinguish both the change in the size and the change in the intensity of the extended radiation source. Therefore, to remove the effect of the signal level change, the two signals are divided and the ratio of the detector signal at wavelength $W_a$ to that at wavelength $W_b$ can detect the change in the size of the extended radiation source without any interference from the change in the intensity of the extended radiation source.

All kinds of filtering techniques can be applied for detection of the local variation in the intensity profile over the extended radiation source.

Furthermore, according to the present invention, the factor which causes the variation of the transmittance curve can be detected and controlled. For example, the transmittance curve depends also on the focus shift of the extended radiation source. Therefore, according to this invention, the focus informations can be obtained by processing the spatially-filtered multi-wavelength detector signals, and the focus of the extended radiation source can be controlled on the basis of the focus informations.

An embodiment of the present invention will be described with reference to the drawings.

Figure 3:
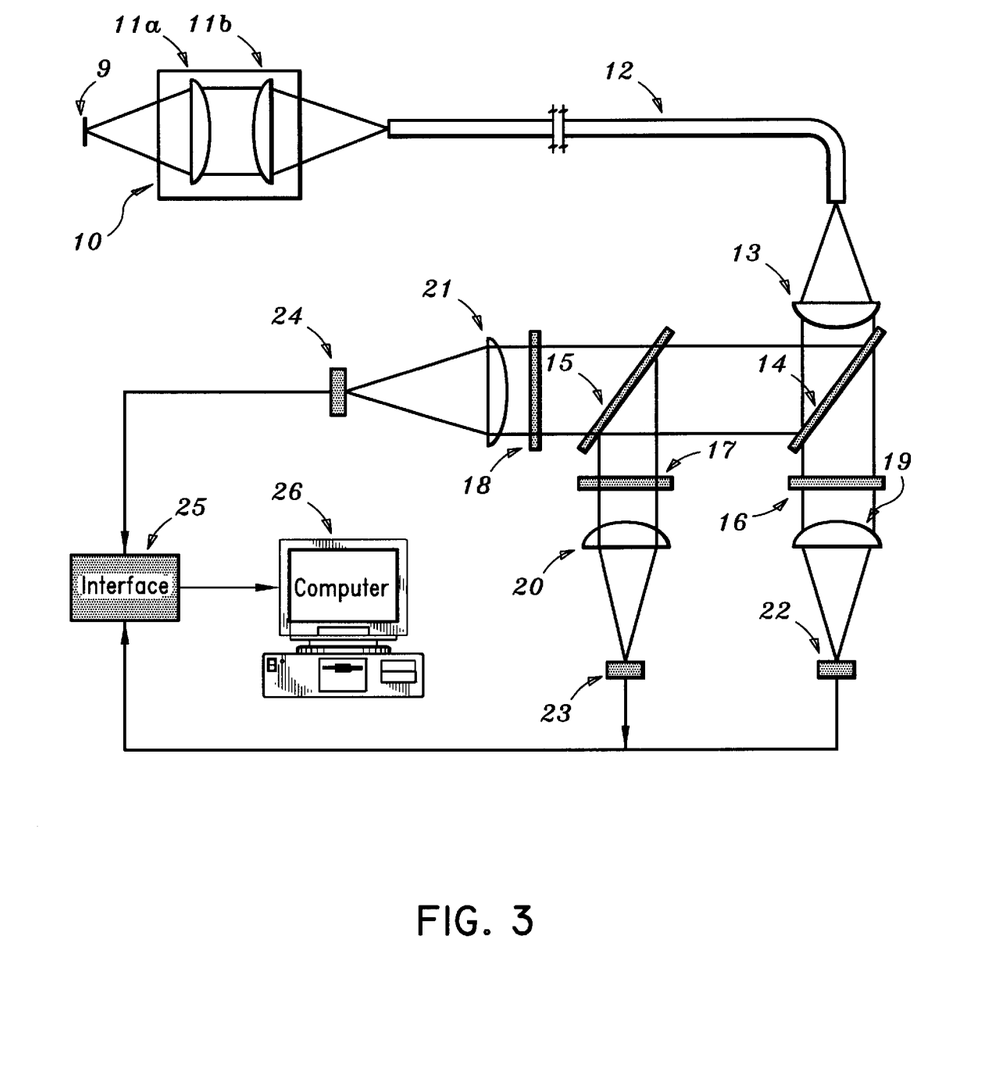
FIG. 3 is a schematic view of the preferred embodiment of the present invention.

In FIG. 3, a remote optical system for monitoring an extended radiation source 9 is shown. The radiation from the extended radiation source 9 is collected and imaged on the input end of a fiber 12 by an imaging optics 10. The imaging optics 10 consists of one or several lenses. If the spherical aberration of the imaging optics 10 becomes large compared to the chromatic aberration, the image blurring due to the spherical aberration reduces the chromatic discrimination by the wavelengths. Therefore, the lenses of the imaging optics 10 have high index of refraction to increase the chromatic aberration and to decrease the spherical aberration. In FIG. 3, the imaging optics 10 consists of two high index of refraction plano convex lenses 11a and 11b to reduce the image blurring due to the spherical aberration of the imaging optics.

A fiber 12 is used as an aperture and also as means for the flexible delivery of radiation. The radiation of the extended radiation source 9 is imaged on the input end of the fiber 12 by the imaging optics 10, and delivered by the fiber 12.

A collimating lens 13 is provided on front of the output end of the fiber 12. The radiation delivered through the fiber 12 is collimated by the collimating lens 13. In order to split the collimated radiation by wavelengths, dichromatic filters 14, 15 are provided after the collimating lens 13.

In this embodiment, three wavelengths $W_1$, $W_2$, and $W_3$ are chosen in the order of $W_1<W_2<W_3$ for the spectral analysis of the extended radiation source. The wavelength $W_2$ is the wavelength to control the focus of the extended radiation source or the wavelength quite near to that control wavelength with almost same chromatic aberration. The wavelengths $W_1$ and $W_3$ are located further from the control wavelength and have much chromatic aberration with respect to the wavelength $W_2$.

In FIG. 3, a first dichromatic filter 14 and a second dichromatic filter 15 are used to split the radiation by wavelengths $W_1$, $W_2$, and $W_3$. The number of dichromatic filter depends on the number of the subject wavelengths for the spectral analysis of the extended radiation source.

The collimated radiation enters into the first dichromatic filter 14. The first dichromatic filter 14 transmits the radiation at wavelength $W_1$ but reflects at both wavelength $W_2$ and $W_3$. Sequentially, the reflected radiation enters into the second dichromatic filter 15, which reflects the radiation at wavelength $W_2$ but transmits the radiation at wavelength $W_3$.

Then, the split radiations pass the band-pass filters 16, 17 and 18. The band-pass filter 16 has only wavelength $W_1$ passed, and the band-pass filter 17 has only wavelength $W_2$ passed, and finally, the band-pass filter 18 has only wavelength $W_3$ passed.

The split and filtered radiations are collected on the corresponding detectors 22, 23, 24 by focusing lenses 19, 20, 21, respectively. The detectors 22, 23, 24 make the detector signals corresponding to wavelengths $W_1$, $W_2$, and $W_3$. The detector signals from the detectors 22, 23, 24 are input to a computer 26 for signal processing by an interface 25.

To be more specific on the preferred embodiment, following specifications are assumed in the analysis. The diameter of the circular extended radiation source 9 is assumed to be near 1 mm and imaged by two SF6 lenses with 25 mm focal length and 8 mm clear aperture on the 1 mm core diameter fiber 12 with one to one magnification. Three wavelengths of 0.532 $\mu$m (wavelength $W_1$), 0.95 $\mu$m (wavelength $W_2$), and 1.5 $\mu$m (wavelength $W_3$) are chosen for spectral analysis.

Figure 9:
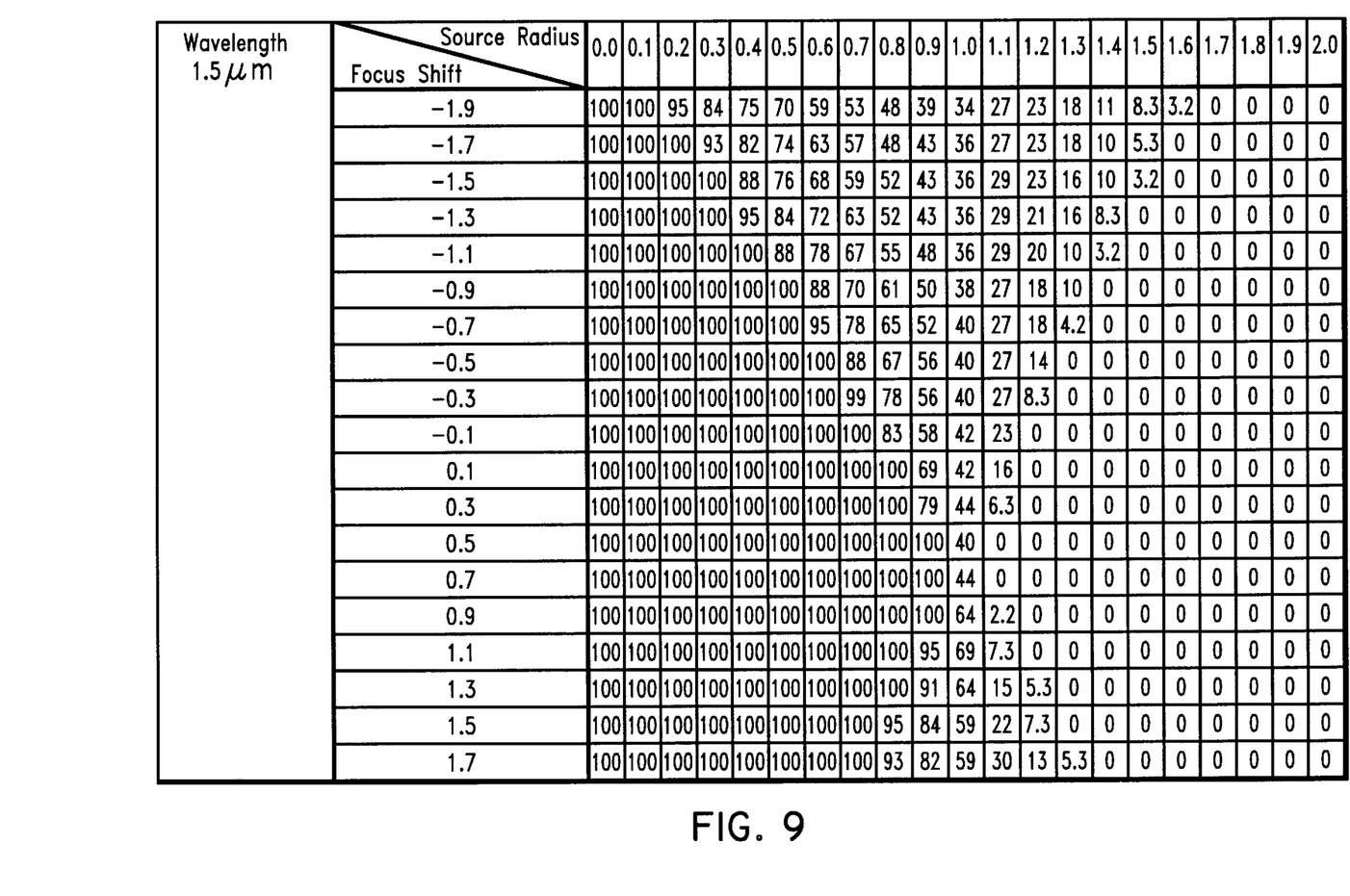
FIG. 9 is a table showing datum of a graph shown in FIG. 6.

The dependence of the transmittance for each source element on the position of the source element over the extended radiation source and the focus shift of the extended radiation source can be calculated at three wavelengths with an optical analysis program. Owing to the circular symmetry, the radius of the source element is varied during the analysis. The transmittance curves vs. the radius of source element and the focus shift of the extended radiation source are shown in three-dimensional diagram in FIGS. 4, 5, 6 and the data are listed in FIGS. 7, 8, 9. In FIGS. 4, 5, 6, x-direction represents the focus shift of the extended radiation source. The positive direction means the outward defocus region and the negative direction means the inward defocus region.

As shown in FIGS. 4 and 5, there is a big difference in the effective radius which can be seen from the detector between wavelength $W_1$ (0.532 $\mu$m) and wavelength $W_2$ (0.95 $\mu$m) signals in the outward defocus region and between wavelength $W_2$ (0.95 $\mu$m) and wavelength $W_3$ (1.5 $\mu$m) signals in the inward defocus region.

As explained above, the ratios of the two spectral signals, wavelength $W_1$ (0.532 $\mu$m) signal over wavelength $W_2$ (0.95 $\mu$m) signal or wavelength $W_3$ (1.5 $\mu$m) signal over wavelength $W_2$ (0.95 $\mu$m) signal, can detect the change in the size of the extended radiation source between the two effective radii in outward or in inward defocus region respectively. Furthermore, the decrease of the effective radius with focus shift is noticeable at wavelength $W_2$ compared to the small decrease in the effective radius with focus shift at wavelength $W_1$ in the outward defocus region and that at wavelength $W_3$ in the inward defocus region. It means the rapid signal drop at wavelength $W_2$ with focus shift compared to the slow signal drop at wavelength $W_1$ in the outward defocus region and at wavelength $W_3$ in the inward defocus region respectively for the extended radiation source of size larger than the effective diameter at wavelength $W_2$. Therefore, the ratio of $W_1$ (0.532 μm) signal over $W_2$ (0.95 μm) signal will increase for outward defocus, and the ratio of $W_3$ (1.5 μm) signal over $W_2$ (0.95 μm) signal will increase for inward defocus. This information can be used for focus control of the extended radiation source.

In the above, we have assumed the intensity profile of the extended radiation source maintains the same shape during the measurement. The case that there is local variation of the intensity profile of the extended radiation source will be explained.

Although there is some increase or decrease in the intensity outside of the effective diameter at wavelength $W_2$, the signal at wavelength $W_2$ does not change since the change of the intensity occurs outside of the effective diameter at wavelength $W_2$. However, there is also some increase or decrease in the signals at wavelengths $W_1$ and $W_3$ in the outward defocus region and in the inward defocus region respectively corresponding to the variation of the intensity. Therefore, the same method as above, using the ratio of $W_1$ signal over $W_2$ signal and the ratio of $W_3$ signal over $W_2$ signal, can be applied to detect the intensity change outside of the effective diameter at wavelength $W_2$ if the size of the extended radiation source is fixed.

Additionally, the the signal at wavelength $W_2$ is very sensitive to the radial misalignment of the extended radiation source from the imaging optics axis compared to the signals at wavelength $W_1$ or $W_3$. Therefore, instead of using the signal at wavelength $W_2$ for tracking of the extended radiation source, the ratio of the signal at wavelength $W_1$ over the signal at wavelength $W_2$ or the ratio of the signal at wavelength $W_3$ over the signal at wavelength $W_2$ can be used in the tracking of the extended radiation source where the intensity variation of the extended radiation source due to the environmental effects can be compensated by the division of the signals.

As to the signal processing of the spectral signals, only the ratio of X/Y has been investigated to detect the local change in the extended radiation source where X is the signal at wavelength $W_1$ or $W_3$ and Y is the signal at wavelength $W_2$. For a repetitive process, the ratio of X/Y at the start of each repetitive process can detect the variation at the start of each process. On the other hand, the ratio of (X–X')/(Y–Y') where X' and Y' are measured with short time delay compared to the period of the repetitive process after the measurement of X and Y can detect the variation occurred after the start of each process, which possibly occurred due to the environmental effects. In other words, the environmental effects on the extended radiation source can be detected from the ratio of (X–X')/(Y–Y').

As described above, the present invention can perform spatial filtering on the extended radiation source by which the local variation of the extended radiation source can be detected from the single-element detector signal.

Further, in case that the focus of the extended radiation source is shifted or the intensity of the extended radiation source is varied, the present invention can detect the change thereof and control the extended radiation source, and in particular, the present invention can detect the local variation of the extended radiation source in realtime and repetitively.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What we claim is:

1. A method for detecting variation of an extended radiation source from single-element detector signals integrated over the extended radiation source, comprising the steps of:

focusing radiation from an extended radiation source on an aperture with imaging optics with chromatic aberration;

spatially filtering the focused radiation from the extended radiation source by transmission through an aperture;

splitting the transmitted radiation by wavelength;

focusing the split radiation on detectors;

detecting each wavelength signal integrated over the extended radiation source repetitively; and processing said signals to detect variation of radiation intensity profile over the extended radiation source; wherein (i) variation of size of the extended radiation source between effective diameters of measured wavelengths can be monitored from the spatially filtered spectral signals; or (ii) signal processing of computing ratio of the spatially filtered spectral signals is used in control of focus shift or centering of the extended radiation source; or (iii) signal processing of computing ratio of differences of the spatially filtered spectral signals where the difference of each spatially filtered spectral signal is computed from two measurements of that spectral signal measured with some delay, is used to monitor change of the extended radiation source including change induced by environmental effects.

2. A method as claimed in claim 1, wherein (ii) or (iii) the signal processing of the spectral signals is computed repetitively for the monitoring of the extended radiation source induced by periodic process.

3. A system for detecting local variation of an extended radiation source comprising:

imaging optics for collection of radiation from an extended radiation source with large chromatic aberration;

an aperture to limit transmission of an image of the extended radiation source;

means for splitting and separating spectrum of radiation by wavelengths;

an interface to digitize spectral signals several times for each repetitive process with varying delays to detect variation in each repetitive process and to monitor change in time in each process; and a personal computer to process the spectral signals.

4. A system as claimed in claim 3, wherein the means for splitting and separating the spectrum of the radiation comprises:

a collimating lens to collimate diverging radiation out of the aperture;

dichromatic filters to split the radiation by wavelengths;

band-pass filters to narrow bandwidth of each wavelength; and focusing lenses to focus each chromatic radiation on a corresponding detector.

5. A system as claimed in claim 3, wherein an input end of a fiber is used as the aperture for remote operation.

6. A system as claimed in claim 3, wherein the imaging optics comprise one or several high index of refraction lenses.

7. A method for detecting size variation of an extended radiation source, comprising the steps of:

focusing radiation from an extended radiation source with imaging optics comprising one or several lenses having large chromatic aberration;

transmitting the focused radiation from the extended radiation source through an aperture located in an image plane of the imaging optics;

splitting the transmitted radiation by wavelength with dichromatic filters and optical band-pass filters;

focusing the split radiation filtered by a band-pass filter on a single-element detector which has only one sensing area;

detecting two spectral signals split by the band-pass filters with two single-element detectors respectively with a digitizing interface; and processing the spectral signals digitally with a personal computer.

8. A method for detecting size variation of an extended radiation source, comprising the steps of:

focusing radiation from an extended radiation source with imaging optics comprising one or several lenses having large chromatic aberration;

transmitting the focused radiation from the extended radiation source through an aperture located in an image plane of the imaging optics;

splitting the transmitted radiation by wavelength with dichromatic filters and optical band-pass filters;

focusing the split radiation filtered by a band-pass filter on a single-element detector which has only one sensing area;

detecting two spectral signals split by the band-pass filters with two single-element detectors repetitively with a digitizing interface;

processing the spectral signals digitally with a personal computer; and further comprising one of the following steps (i)–(v):
  (i) applying spatial filtering to a chromatic intensity profile of the extended radiation source automatically with a transmittance profile of the imaging optics through the aperture located in the image plane of the imaging optics at a measured wavelength,
  wherein the chromatic intensity profile is multiplied by the transmittance profile at each element of the extended radiation source and the multiplication at each element of the extended radiation source is integrated over the entire extended radiation source;
  (ii) selecting two wavelengths wherein one wavelength is a wavelength to monitor the size variation of the extended radiation source and is used in imaging of the extended radiation source on the aperture and the other wavelength is located far from the size monitoring wavelength toward either longer or shorter wavelengths such that a transmittance profile of the other wavelength has a non-zero value over a wider area of the extended radiation source than size of non-zero transmittance area of the size monitoring wavelength;
  (iii) size variation of the extended radiation source between a non-zero transmittance area of a size monitoring wavelength and a wider non-zero transmittance area of another wavelength is monitored from variation in ratio of two spectral signals spatially filtered with the non-zero transmittance profiles;
  (iv) focus shift of a fixed-size extended radiation source is monitored from variation in ratio of two spectral signals spatially filtered through the aperture with focus-shift dependent non-zero transmittance profiles, wherein size of the aperture is the same as an image size of the fixed-size extended radiation source at a size monitoring wavelength;
  (v) signal processing of computing a ratio of spatially filtered spectral signals is used in control of focus shift or centering of the extended radiation source.

9. A method as claimed in claim 8, further comprising, in addition to step (i), the step of:

varying bandwidth of the spatial filter for each chromatic intensity profile of the extended radiation source by selecting wavelength and by adjustable chromatic aberration of the imaging optics.

10. A method for detecting size variation of an extended radiation source, comprising the steps of:

focusing radiation from an extended radiation source with imaging optics comprising one or several lenses having large chromatic aberration;

transmitting the focused radiation from the extended radiation source through an aperture located in an image plane of the imaging optics;

splitting the transmitted radiation by wavelength with dichromatic filters and optical band-pass filters;

focusing the split radiation filtered by a band-pass filter on a single-element detector which has only one sensing area;

detecting two spectral signals split by the band-pass filters with two single-element detectors repetitively with a digitizing interface; and processing the spectral signals digitally with a personal computer;

wherein signal processing of computing ratio of differences of spatially filtered spectral signals where difference of each spatially filtered spectral signal is computed from two measurements of that spectral signal measured with some delay, is used to monitor change of the extended radiation source including change induced by environmental effects, and the signal processing of the spectral signals is computed repetitively for the monitoring of the extended radiation source induced by periodic process.

* * * * *